(12) United States Patent
Root et al.

(10) Patent No.: US 7,931,344 B2
(45) Date of Patent: Apr. 26, 2011

(54) REMOTE CONTROL BRAKE SYSTEM AND MANIFOLD

(75) Inventors: Kevin B. Root, Black River, NY (US); Richard J. Teifke, Jr., Mexico, NY (US); Brian P. Cameron, Potsdam, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 12/707,708

(22) Filed: Feb. 18, 2010

(65) Prior Publication Data

US 2010/0152934 A1      Jun. 17, 2010

Related U.S. Application Data

(63) Continuation of application No. 11/531,891, filed on Sep. 14, 2006, now Pat. No. 7,703,860.

(51) Int. Cl.
*B60T 8/34* (2006.01)
(52) U.S. Cl. .............................. 303/7; 701/19
(58) Field of Classification Search .............. 303/7, 20, 303/15, 16, 128; 701/19, 70
See application file for complete search history.

(56) References Cited

U.S. PATENT DOCUMENTS

| | | | |
|---|---|---|---|
| 5,053,964 A * | 10/1991 | Mister et al. ................... 701/19 |
| 5,685,507 A | 11/1997 | Horst et al. |
| 6,036,284 A | 3/2000 | Pettit et al. |
| 6,334,654 B1 | 1/2002 | Root et al. |
| 6,964,456 B2 | 11/2005 | Root |
| 2003/0183729 A1 | 10/2003 | Root et al. |
| 2004/0207521 A1 | 10/2004 | Lumbis et al. |
| 2005/0085960 A1 | 4/2005 | Lumbis et al. |
| 2005/0125112 A1 | 6/2005 | LaDuc et al. |
| 2008/0067866 A1 | 3/2008 | Root et al. |

* cited by examiner

*Primary Examiner* — Robert A Siconolfi
*Assistant Examiner* — Anna Momper
(74) *Attorney, Agent, or Firm* — Barnes & Thornburg LLP

(57) ABSTRACT

A locomotive brake system includes a plurality of electronic air brake controllers for controlling at least a train brake pipe and a locomotive brake pipe interconnected by a communication network. A communication port and a system controller are connected to the network. The system controller controls the configuration of the electronic air brake controllers for standard mode and remote mode of the brake system and assembling EAB network signals for communication between a remote locomotive controller to be connected to the communication port and the electronic air brake controllers.

13 Claims, 5 Drawing Sheets

REMOTE CONTROL BRAKE SYSTEM AND MANIFOLD

CROSS REFERENCE

The present application is a continuation of U.S. patent application Ser. No. 11/531,891 filed Sep. 14, 2006 and which is incorporated herein by reference.

BACKGROUND AND SUMMARY OF THE INVENTION

The present invention relates generally to locomotive brake systems and remote controlled locomotives (RCL) and more specifically to adaptation of a locomotive brake systems as a remote controlled locomotive (RCL).

One remote controlled locomotive or remote operated locomotive system usually includes a remote control transmitter (RCT) carried by an operator. In the industry, these are known as belt packs. Alternatively, there may be a console in the yard or a tower. The RCL systems are used to move a locomotive and the cars over a very short distance at a very low speed. It usually allows a remote operator not on the train to operate the system. The RCL systems control the propulsion and braking of the locomotives.

Another form of remote control of locomotives is communicating from a lead locomotive to remote trailing locomotives distributed throughout the train. The operator at the control of the lead mode locomotive sets the propulsion and braking at the lead locomotive, and appropriate signals are sent to the remote locomotives that are in trail mode to execute the required braking or propulsion. This may be the same braking or propulsion setting, or it may be a customized setting depending upon the location of the remote locomotive within the train. In this group of control over remote locomotives, the actual primary locomotive brake system is that which is being controlled. It controls not only the brake of the locomotive but may also operate on the brake pipe, which runs throughout the train.

Historically, RCL systems have used a standalone control of the propulsion and brakes on the train. This is in parallel to the standard locomotive control system. It has been suggested that the system used to control remote locomotives may also be adapted to use the primary brake system to be responsive to a portable remote control transmitter or belt pack. This requires appropriate interlocks and safety measures since it operates with the primary braking system. Such a system is shown in U.S. Pat. No. 6,964,456, which is incorporated herein by reference.

Present intelligent Electronic Air Brake (EAB) Systems developed for railroad locomotives are designed to interface with other subsystems as distributed power (DP) and electronically controlled pneumatic (ECP) train brakes. Such a system is shown in U.S. Pat. No. 6,334,654, which is incorporated herein by reference. An example is the CCB II system available from New York Air Brake. These integrations are subsystem specific as they are designed, and software written, that operate exclusive for that subsystem. Intelligent components of one EAB cannot be interchanged with that of another subsystem without compromising the functionality. This also is true with subsystems of like functionality but of differing OEM suppliers.

Remote Controlled Locomotive (RCL) subsystems available from different OEMs are of varying structures, interfaces and degrees of operability. Each OEM has their unique braking interface, be it pneumatically 'serial' or 'parallel' of the locomotive's braking system. Either configuration is reliant on the locomotive's core braking system. Typically, the RCL subsystem is the control of each power and braking for a railway vehicle, such as a locomotive. The RCL comprises on-board equipment that has a direct interface to the Electronic Air Brake (EAB) equipment as well as the power equipment and various feedback devices that are not within the confines of the EAB equipment. The on-board RCL subsystem may receive Operator commands remotely through an RF interface, tether cord and/or wayside equipment. The RCL may be completely without a human operator as commands are generated by distributed intelligence.

It is desirable to provide an EAB system which interfaces with diverse RCL subsystems, while maintain interchangeability of EAB core components and keeping a high degree of safety. Preferably this is achieved by appropriate connection of the devices without reprogramming the software in the system.

The present locomotive brake system includes a plurality of electronic air brake controllers for controlling at least a train brake pipe and a locomotive brake pipe interconnected by a communication network. A communication port and a system controller are connected to the network. The system controller controls the configuration of the electronic air brake controllers for standard mode and remote mode of the brake system and assembling EAB network signals for communication between a remote locomotive controller to be connected to the communication port and the electronic air brake controllers.

The system may include an interface device connected to the communication port and configured to interface the EAB network signals and signals of a remote locomotive controller connected to the interface device. The interface device may include a plurality of RCL ports for connection to a remote locomotive controller and interfaces the EAB network signals at the communication port and the signals at the RCL ports. The plurality of interface devices communicate with each other on the network by RCL signals and each has an RCL port for connection to a remote locomotive controller. One of the interface devices is a primary device which interfaces the EAB network signals of the communication port and the RCL signals of the interface devices. The interface device may be configured to interface the EAB network signals and serial digital signals, parallel digital signals or analog signals of a remote locomotive controller connected to the interface device.

The system controller assembles train and locomotive brake signals received from the communication port and transmits to the electronic air brake controllers, and assembles and transmits status signals to the communication port. The controller may poll the communication port to determine the type of remote locomotive controller is connected to the communication port and assembles EAB network signals for communication between a remote locomotive controller to be connected to the communication port and the electronic air brake controllers for the determined type of remote locomotive controller.

The system controller initially may poll all the electronic air brake controllers and assign an identifier to each which authorizes them to have a remote mode. Upon replacement of one of the electronic air brake controllers, the system controller or one of the authorized electronic air brake controllers assigns an identifier to the replacement which authorizes it to have a remote mode.

The brake system may include a cut-in system connected to the train brake pipe and the locomotive brake pipe to provide a braking signals on the train brake pipe and the locomotive brake pipe when the cut-in system is initially activated and subsequently controlled by the system controller to provide releasing signals on the train brake pipe and a locomotive brake pipe once the brake system is in the remote mode. The cut-in system may include a pressure sensor monitoring the brake signal provided to the locomotive brake pipe and providing an activation signal to the system controller. The system controller monitors conditions of the locomotive brake system during receipt of the activation signal before setting the remote mode and to maintain the remote mode.

These and other aspects of the present invention will become apparent from the following detailed description of the invention, when considered in conjunction with accompanying drawings.

DETAILED DESCRIPTION OF THE PREFERRED EMBODIMENTS

Figure 1:
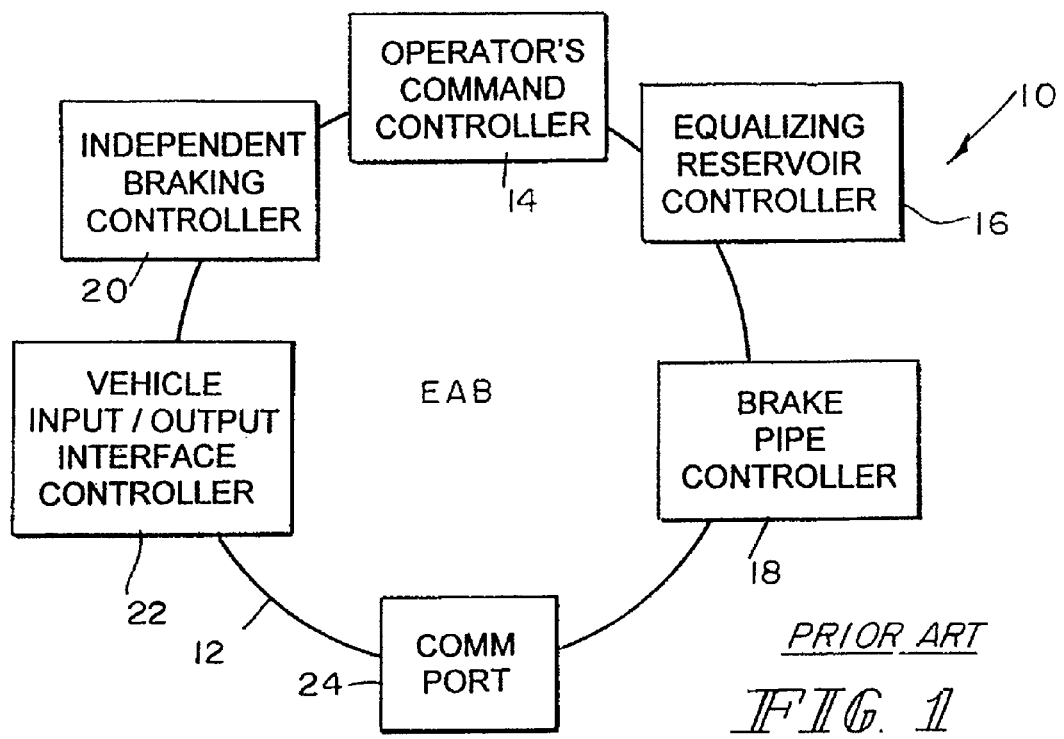
FIG. 1 is a schematic of a prior art electric air brake system having electric air brake controllers connected by a network.

FIG. 1 show a known Electronic Air Brake (EAB) subsystem 10 consists of 'intelligent controllers' that are linked and share information or commands over an EAB network 12. As an example, a CCB II available from New York Air Brake and shown in U.S. Pat. No. 6,036,284 is incorporated herein by reference. There are five intelligent controllers depicted in FIG. 1 as depicting a typical railway locomotive arrangement. The quantity and functional characteristics of intelligent controllers may and do vary between braking subsystem applications.

An operator inputs manual control commands for braking of a railway vehicle through the Operators Command Controller 14. The operator's commands are then communicated to the appropriate intelligent controller for the movement of compressed air to the application or release of braking effort. For example, an Equalization Reservoir Controller 16 responds to commands from the EAB network 12 in response to operator input of the Operators Command Controller 14 to electronically control a pressure level in an equalization reservoir. A Brake Pipe Controller 18 is responsive to signals on the EAB network 12 and the value of the pressure in the equalization reservoir to control the pressure in the train brake pipe. The Equalization Reservoir Controller 16 and the Brake Pipe Controller 18 make available the pressure level status of the equalization reservoir and the train brake pipe respectively over the EAB network 12, to all the intelligent controllers.

An Independent Braking Controller 20 responds to commands on the EAB network 12 from the Operators Command Controller 14 to electronically control a pressure level in a trainline or locomotive brake pipe (commonly referred as Independent Application & Release Pipe). The Independent Braking Controller 20 makes available the pressure level status of the locomotive pipe, over the EAB network 12, to all the intelligent controllers.

The EAB network 12 is the means of the EAB subsystem 10 to relay braking commands and status throughout the subsystem of intelligent controllers to provide operation of the railway vehicle's brakes. Also on the EAB network 12 is a Vehicle Input/Output Interface Controller 22 and a Communication Node 24. The Communication Node 24 may be part of or in the Vehicle Input/Output Interface Controller 22. Other locomotive systems are connected to the EAB via the Vehicle Input/Output Interface Controller 22, such as Distributed Power, Electronically Controlled Pneumatic brakes, etc.

Figure 2:
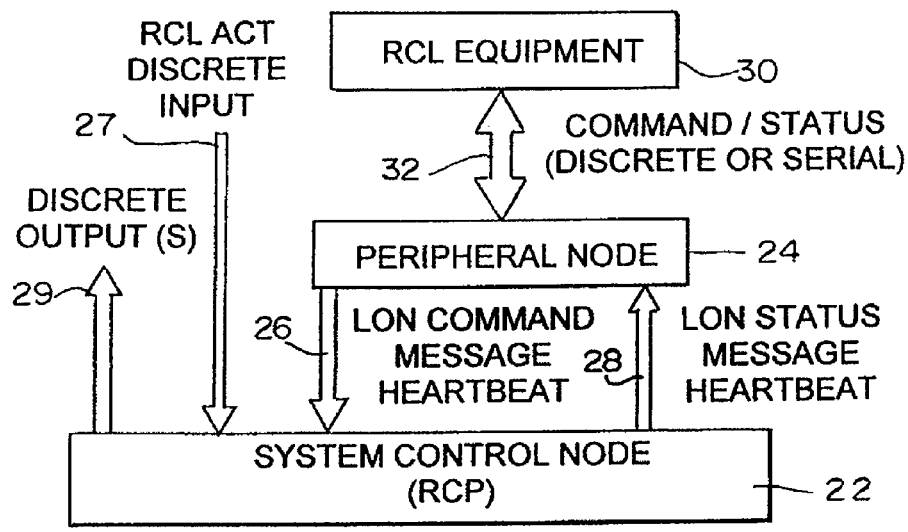
FIG. 2 is a signal flow diagram of an electric air brake system incorporating remote control capability according to the present disclosure.
Figure 2:
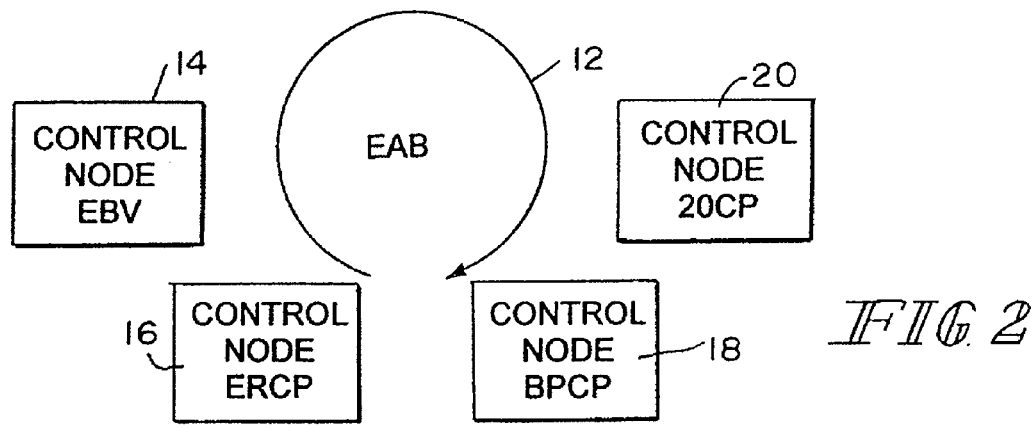

Additional intelligent controllers are added to the EAB network 12 for the option of allowing input commands of braking from a Remote Controlled Locomotive (RCL)' subsystem 30 in lieu of that of the Operators Command Controller 14 as shown in FIG. 2. The vehicle input/output interface controller 22 has been shown as a system control node. It may also be known as a Relay Control Portion (RCP) in an electronic air brake system now known as CCB 26 system available from New York Air Brake Corporation. A description of the CCB 26 may be found in the article, "The CCB 26 Locomotive Brake System 26 L Replacement for the Next Generation," by John M. Reynolds, published in the Proceedings of the 97$^{th}$ Annual Conventional and Technical Conference in the American Brake Association of Sep. 19-20, 2005, pp 127-140. Such a system is described in a paper. The Communication Node 24 is shown as peripheral node 24.

Peripheral node 24 is on the EAB network 12 and is shown as providing LON command messages and heartbeat 26 to the system control node 22 via the EAB network 12. System control node 22 provides LON status message and heartbeat 28 to the peripheral node 24 over the EAB network 12. Please note that this is a signal flow diagram and not a mechanical connection since they are interconnected and communicating to each other over the EAB network 12. The peripheral node 24 communicates and provides interface to the RCL equipment 30 via connection 32 and provides command and status by a discrete or serial connection. This connection is a function of the structure and the interface requirements of the RCL equipment 30.

The system control node 22 receives a discrete RCL activate input signal 27. This is independent of the EAB network 12. It may also provide a series of discrete outputs on terminal 29.

The RCL subsystem 30, as well as DP, ECP or any interface wanting the control of train or unit brakes, have two fundamental or primary needs from the EAB subsystem 10. Namely control of the brake pipe through the equalizing reservoir pressure, and control of the locomotive's brake through the independent application & release pipe as well as the actuating pipe (bail).

At the minimum, the core braking logic needs to respond to enforcement braking overriding that of the RCL. Emergency reductions have priority as break-in-two, Operator or Fireman. Safety equipment penalties, pneumatically activated on the EAB system are honored.

Part of the fundamental needs is communication of status information to signal the proper response of train brake and locomotive braking to the RCL subsystem 30. At the minimum this would include brake pipe and independent pipe pressures. It is the diversity between RCL of the various status or feedback signals required from the EAB subsystem to each unique control scheme(s) that defines their equipment.

The present system is designed to provide a wide diversity of interfaces and allow flexibility in OEM required functionality or uniqueness, while maintaining its' core interchangeability. In doing so, there are 'RCL foundation design rules' within the core EAB logic to ensure component interchangeability. If/When this foundation rules are compromised, then RCL subsystem interchangeability of EAB core components are compromised.

Figure 3:
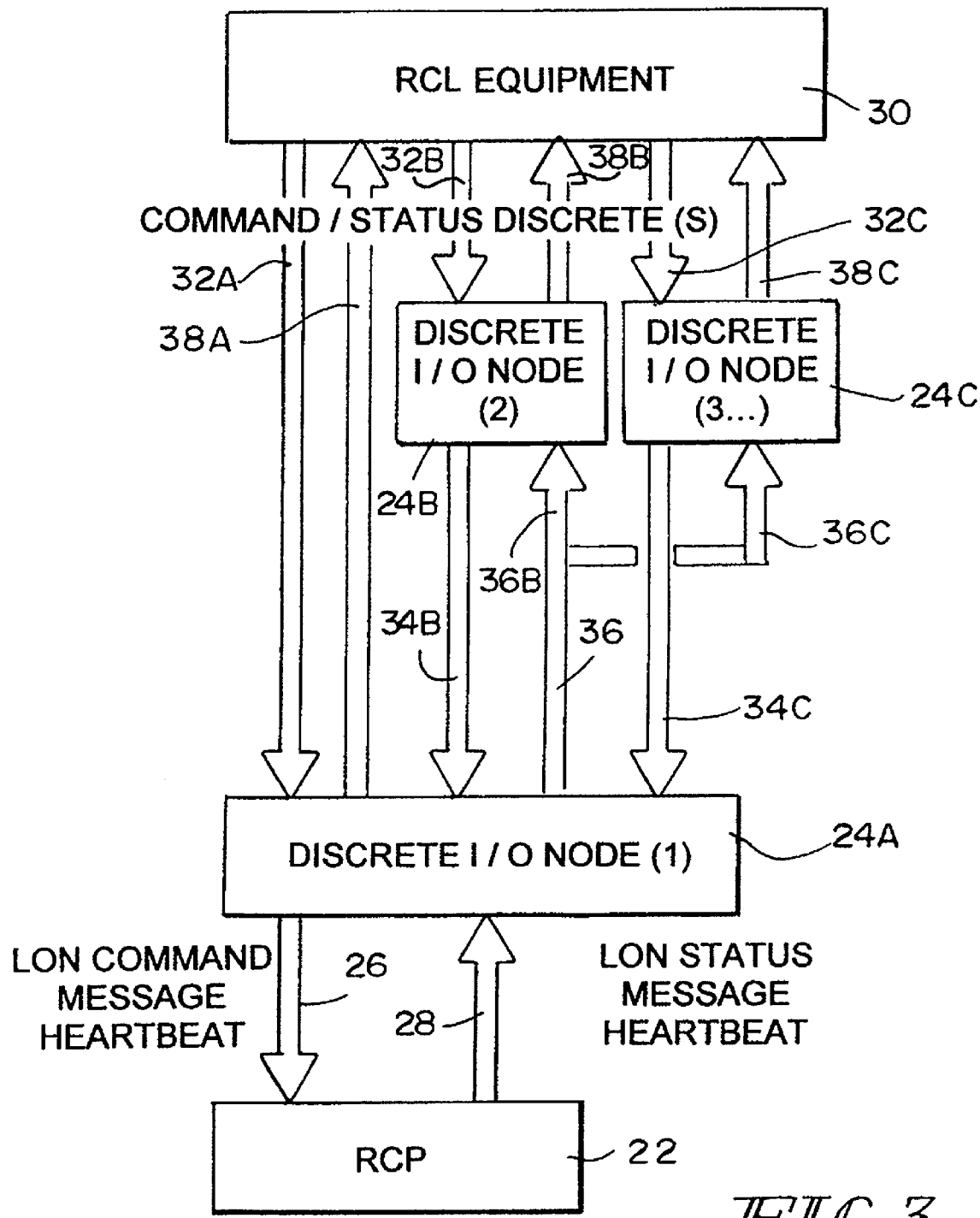
FIG. 3 is a signal flow diagram for a remote control locomotive equipment having three discrete interface devices.

The system controller 22 controls the configuration of the electronic air brake controllers for standard mode and remote mode of the brake system and assembling EAB network signals for communication between a remote locomotive controller to be connected to the communication port 24 or the interface nodes 24 and the electronic air brake controllers. The interface nodes 24 are configured to interface the EAB network signals and signals of a remote locomotive controller 30. The interface nodes 24 may include a plurality of RCL ports for connection to a remote locomotive controller 30 and interfaces the EAB network signals and the signals at the RCL ports. The plurality of interface nodes communicate with each other on the network by RCL signals and each has an RCL port for connection to a remote locomotive controller 30. One of the interface nodes 24 is a primary device which interfaces the EAB network signals of the communication port and the RCL signals of the interface devices, as shown in FIG. 3. The interface node 24 may be configured to interface the EAB network signals and serial digital signals, parallel digital signals or analog signals of a remote locomotive controller connected to the interface device.

The system controller 22 assembles train and locomotive brake signals received from the RCL system 30 via the interface nodes 24 and transmits to the electronic air brake controllers, and assembles and transmits status signals to the interface node 24. No special re-programming of the system controller 22 is required for the different system requirements of the different RCL equipment 30. Variations in connectivity is provided by the interface nodes 24 which are RCL specific.

An RCL subsystem 30 interface to EAB system 10 would either be Discrete or Serial. Discrete is that of a combination of digital and analog signals as that of today's pneumatic interfaces. Serial is that of command and status passed through a communications protocol.

The RCL subsystem interface is input/output through intelligent control Node(s) 24 that are placed onto the core EAB network 12. The Node(s) 24 are OEM interface specific. The Node(s) 24 are the gateway into the core EAB braking logic. The EAB braking logic, or core control portions (nodes), has the functional remote logic. The Node(s) 24 handle the specific interface requirements be it multiple discrete or serial (optional communication).

A single RCL Command and a single RCL Status message protocol for the EAB network is defined for operation of EAB system to encompass all the foreseeable variable factors allowed under RCL control. These distinct RCL Messages are the functional interface messages within the core EAB braking logic. The system control or Relay Control Portion's (RCP) node 22 logic is the 'pilot' between the RCL subsystem 30 and the EAB braking logic. The RCP 22 receives the RCL Command Message, disseminates and delivers to the appropriate EAB controllers. The RCP 22 also collects the defined status data from the EAB controllers to build and send the RCL Status Message.

The defined response to RCL command and feedback of status is universal for the EAB braking logic. Responses are defined for all those configurations and/or options foreseen. These are the RCL foundation design rules.

Translation and content of these messages are performed by the RCL peripheral node(s) 24. Those commands that are not directly received from the RCL subsystem 30, commands that are optional in nature, are 'default' set commands by a peripheral node 24. Those statuses that are not required by the particular RCL subsystem 30 interfaced are simply not translated by the peripheral RCL node 24.

Whereas there is more than one interface node 24 to the RCL subsystem, a primary node is designated as the pilot of these peripheral nodes. Referring to FIG. 3; Architecture for example, the node 24A is designated the primary. The 24A node receives the RCL Status Message, disseminates and delivers to the appropriate 24B, 24C or more node(s). The 24A node also collects the defined command data from the 24B and/or more nodes 24 to build and send the RCL Command Message.

As shown in FIG. 3, the interface node 24 includes three intelligent controllers or interface devices 24A, 24B and 24C. The interface devices controller 24 include an input 32 for an analog command signal from the RCL 30 and an output 38 of an analog status signal to the EAB status to the RCL 30.

Interface devices 24B and 24C provide command signals to the primary interface device 24A over the EAB network 12 as illustrated by lines 34B and 34C respectfully. The status signals from the primary interface device 24A are provided to interface devices 24B and 24C over the EAB network 12 as illustrated by lines 36B and 36C. The primary interface device 24A communicates LON command messages by line 26 to the RCP 22 as illustrated and receives LON status via line 28 from RCP 22.

One example for the configuration of FIG. 3, is that the primary interface node 24A would receive the train brake command while interface device 24B would receive the locomotive brake command. The appropriate status of these brake applied can then be transmitted back through 24A and 24B. The interface 24C may provide other status information requested, for example, air flow measured by the EAB system 10.

Figure 4:
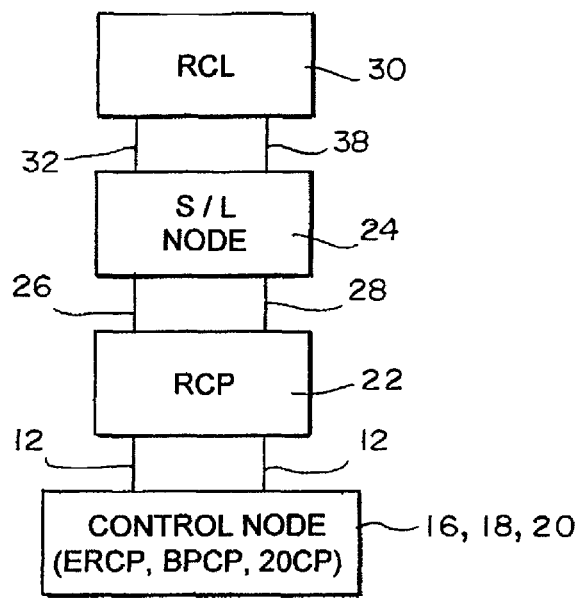
FIG. 4 is a signal flow diagram for a remote control locomotive with a serial to LON connection.

A serial to LON interface node 24 is illustrated in FIG. 4. The RCL system 30 provides commands over serial port 32 and receives status via port 38. The interface node 24 provides the commands to the RCP 22, over the network 12 as illustrated by lines 26 and receives the status signals back from RCP 22 via over the network 12 as illustrated in lines 28.

The number of interface devices is not fixed and nor are means of sharing the commands of status as analog signals. Although FIGS. 3 and 4 shows the software interconnection of these modules, they may be physically connected in series on a single comport 24 depending upon the EAB system 10. For example, they may be connected in series with the operation command controller EBV to the port for the EBV on the EAB system 10.

The interface devices may be serial communications of RS-232 or 422 to LON, digital input/output through EAB control nodes as well as the analog input/output device. Communication interface could be Ethernet or direct MIP. Interfaces may be singular or of any combination.

The actions to be taken on system failures or fault detections by the braking system of an RCL equipped locomotive are different than that of main line or conventional EAB operation. Thereby, the design of an EAB for dual purpose operation, either RCL or Conventional, need be equipped for differentiating fault actions. An Auxiliary Application Unit (AAU) is provided to overlay the RCL enforcement braking requirement onto the conventional EAB operation.

Figure 5:
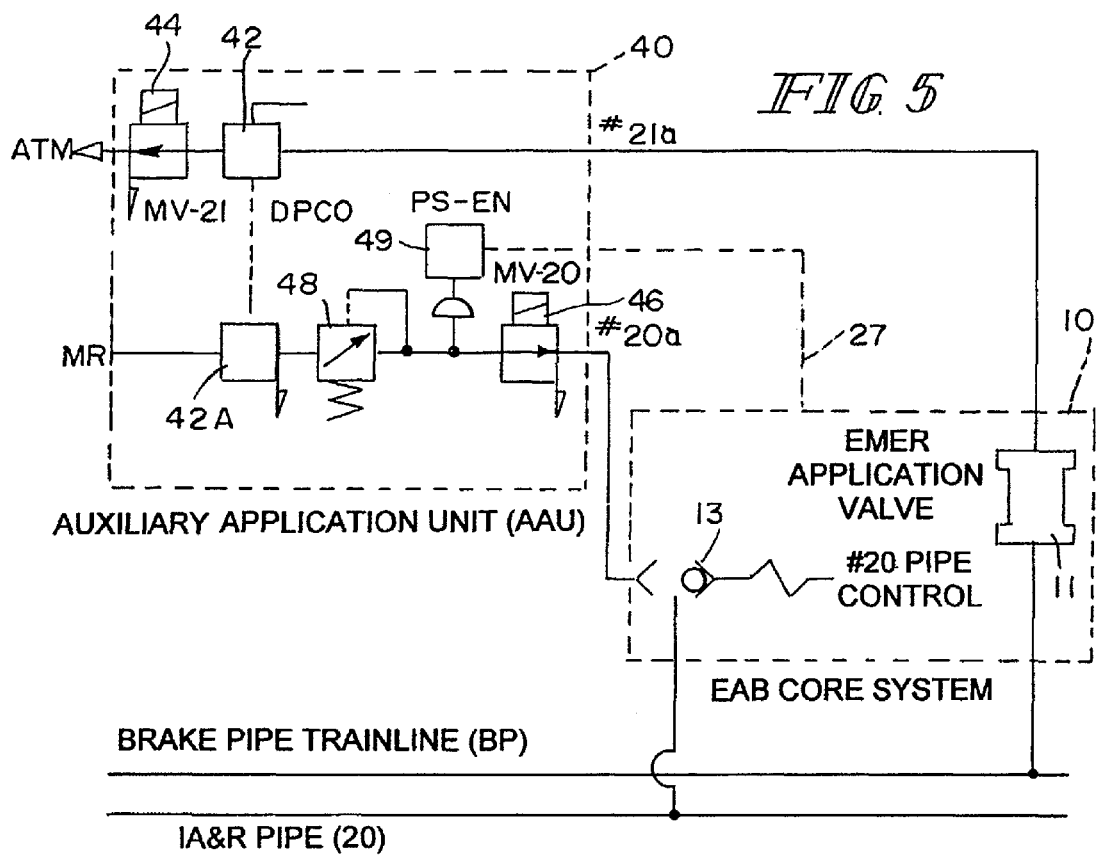
FIG. 5 is a flow schematic of an auxiliary application unit according to the present disclosure.

The AAU 40, as shown in FIG. 5, has a 'manual' Cut-In or Cut-Out device or double port cut-off DPCO 42 and 42A for an RCL enforcement brake. It consists of a normally de-energized magnet valve 44 for the initiation of emergency brake application via emergency application valve 11 of the EAB 10 and a normally de-energized magnet valve 46 for full application of independent braking. This unit has a sensor 49 that indicates to the EAB 10 as an RCL Activate signal, that the AAU 40 is Cut-In with air pressure for the required application of independent effective braking. The RCL subsystem 30, responsible for braking control, is in direct control of the emergency and independent magnet valves 44,46. Magnet valves must be energized to release brakes. A pressure sensitive valve 48 is also provided at the output the device 42A.

The Cut-In of the AAU 40 results in the application of braking on the unit irregardless of the power or mode state of the RCL subsystem 30. The EAB subsystem 10 can no longer operate in a Conventional mode. The AAU sensor 49 is the RCL Activate input 27 (FIG. 2) to the EAB braking system 10 via the system control node RCP 22 as conventional operation is no longer desired due to the potential hazards associated with RCL's enforcement brake. A double check valve 13 in the EAB 10 applies the large of the independent or locomotive brake signals from the EAB 10 and the AAU 40 to the IA&R locomotive brake pipe.

Normally, the EAB system 10 is in the standard EAB mode and responsive to the signals from the operator's command controller 14 and the DPCO 42 is in Cut-out. To enter RCL operation or RCL Mode, a defined Set-Up is required. As previously described, there are different enforced braking rule sets when operating in RCL then when in Conventional or EAB Mode. Also, these rule sets are in force when the DPCO 42 of the AAU 40 is manually opened. Thereby, the pressure switch PS-EN 49 of the AAU is the input directly to EAB system 10 as a command to Activate RCL mode of operation.

Note that an emergency brake application shall occur and the independent brake will fully apply on opening of the DPCO 42.

Assurance of the 'rule set' between operational modes is critical to safe operation. The change to RCL operation of braking is not desired unless braking is healthy, brakes are presently applied and command status with the RCL subsystem is healthy.

Secondly, no response is taken directly to the RCL activate input command when in conventional or EAB mode of operation. This avoids an undesired emergency brake application which is the detected fault response of EAB in RCL mode.

Figure 6:
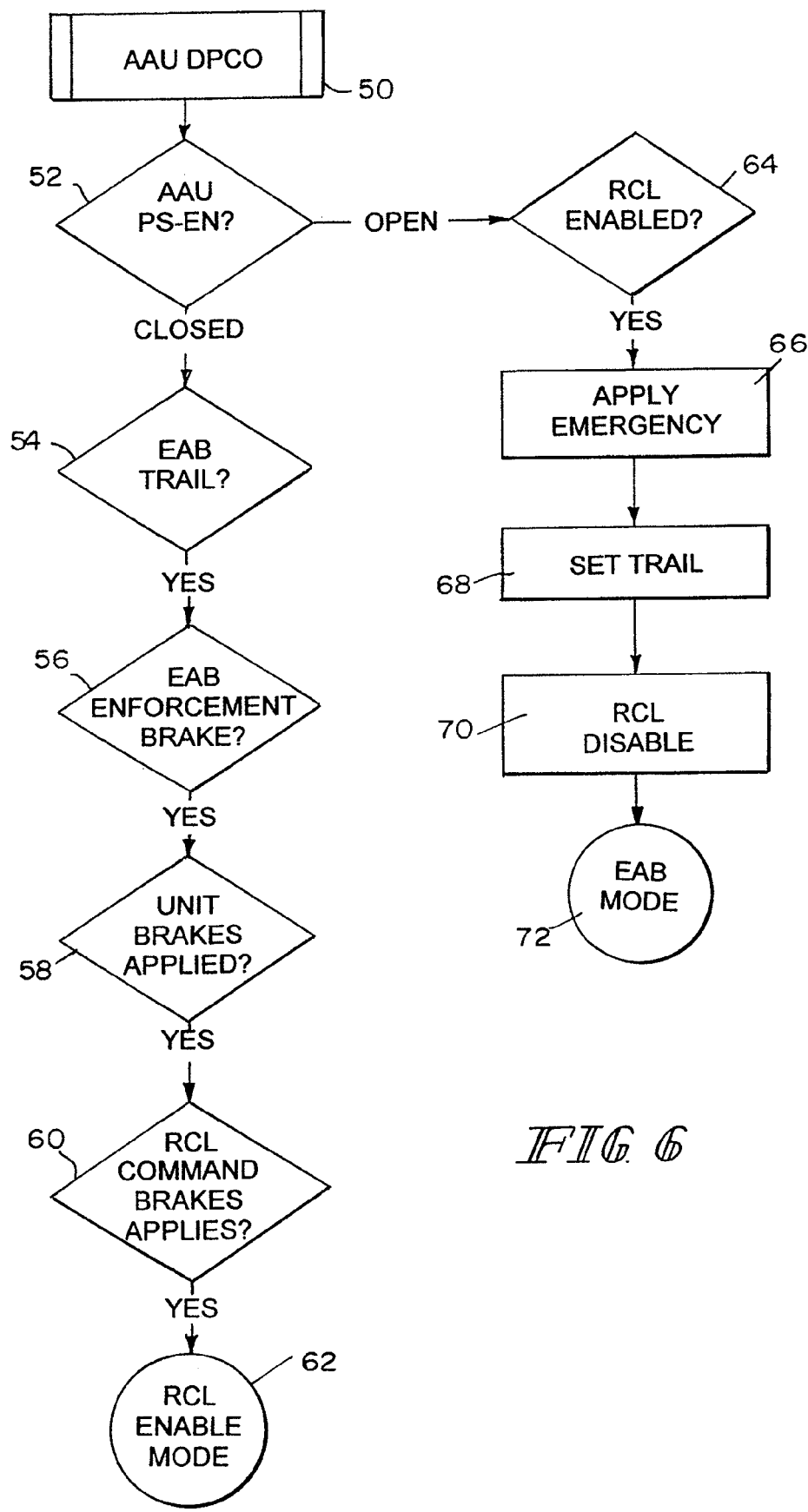
FIG. 6 is a logic diagram for entering and exit the remote control locomotive mode.

FIG. 6 describes the set-up conditions and required conditions to transfer states in response to the RCL Activate command or PS-EN of the AAU 40.

At Step 50 the DPCO 42 of the AAU 40 is manually set to the cut-in mode. Next it is determined at Step 52 whether this has occurred by measuring the pressure on the locomotive brake pipe by sensor 49. If the pressure sensors switch 49 is closed, which indicates that the DCPO 42 is in cut-in mode, it is next determined at Step 54 whether the EAB system 10 is in the trail mode. If it is in the trail mode at Step 56, it is determined whether there is an EAB brake enforcement. If there is then at Step 58, it determines whether the locomotive or unit brakes are applied. If they are, it is determined at Step 60 whether the RCL command brakes are applied on the train brake pipe. If they are, the EAB system 10 under the control of the system control node 22 sets the EAB system 10 to the RCL enable mode. This directs each of the EAB controllers to receive their controls from the RCL subsystem 30 instead of the operator's command controller 14.

At Step 52 if the pressure sensor 49 is open meaning the pressure is low, it is determined at Step 64 whether the RCL is enabled, if it is, an emergency application is provided at 66 and the system is set to trail at Step 68. The RCL is disabled at Step 70 and the EAB system 10 enters the EAB mode at Step 72.

Note that an exit from RCL mode of operation is immediate and distinct on the loss of RCL Activate input through an emergency brake application initiation by EAB 10. RCL 30 is not allowed to operate without the AAU 40 being Cut In.

The RCL subsystem interface is optional to the EAB core or base subsystem. There is then a license security algorithm within the EAB subsystem to allow individual EAB intelligent controllers to be interchanged between non-equipped and that of differently equipped RCL subsystem vehicles.

Figure 7:
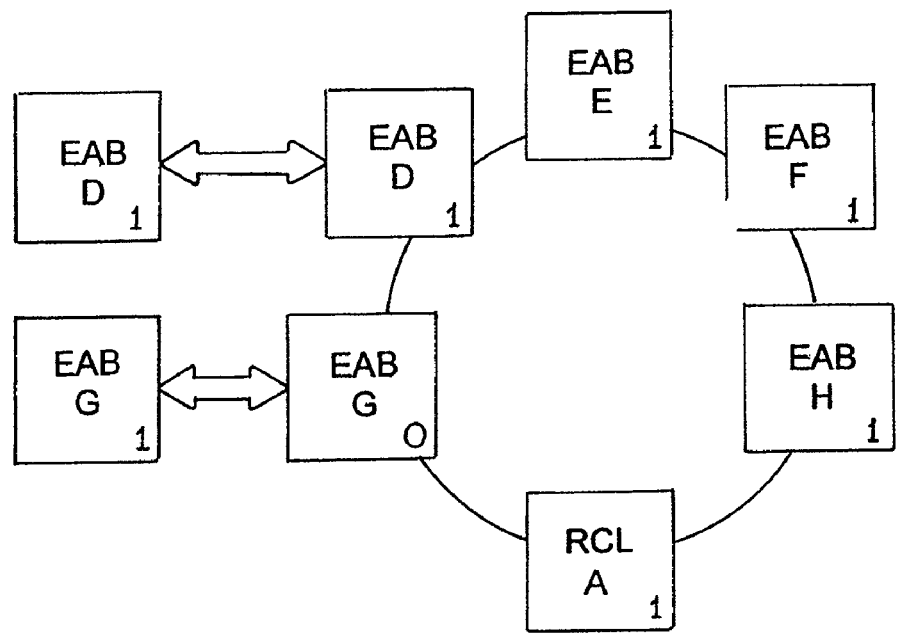
FIGS. 7 and 8 are diagrams illustrating remote mode authorization of replaced electronic air brake controllers.
Figure 8:
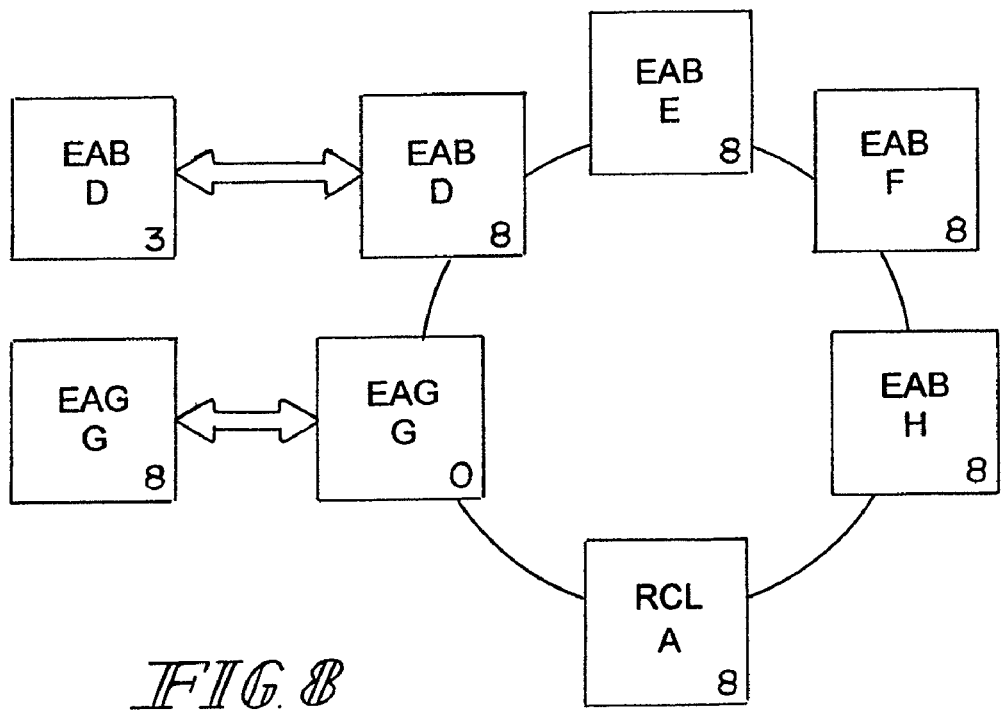

An RCL subsystem requires its' unique RCL intelligent interface controller(s) within the EAB network 12 of the EAB subsystem 10. Only those railway vehicles supplied with an RCL subsystem would have an RCL primary intelligent controller. The RCL primary intelligent controller is the license controller which authorizes the EAB controllers to have a RCL or remote mode. In the previous figures, the license controller may be the primary interface node 24 or the system control node 22. In the examples of FIGS. 7 and 8 the license node will be signified by RCL A.

The RCL A is connected to a 'non-licensed' EAB subsystem 10. The RCL A has a license algorithm that is set to execute in its entirety a single time. On prompt, as in a request to enter RCL operation, the RCL A will execute this license algorithm. The RCL A shall poll the EAB network 10 to create a 'list' of RCL interface devices and/or EAB Controllers (D-H). With all present and accounted, the RCL A shall then authorize RCL mode of operation for each RCL Device (B-C) and/or EAB Controller (D-H). Each RCL Device (B-C) and/or EAB Controller (D-H) is then licensed and retains licensed RCL operation mode. The primary RCL Device A at completion of execution of its license algorithm does not execute a second time. Only reset by the OEM will allow reset of license algorithm.

In the afore mentioned description, an EAB Controller D through H may be interchanged between RCL equipped and non-equipped rail vehicles without being unique or otherwise having the same identifier. The EAB Controller interchanged may not be licensed for RCL operation. As described, an EAB Controller will retain its' authorized RCL operational mode. Interchange of an EAB Controller requires the removal of power of the EAB subsystem. On power-up, a non licensed EAB Controller, for example D, will poll the other EAB Controllers, for example E-H, and reliant on their license status, and then authorize itself into the RCL operational mode.

Typical maintenance practices for a railway vehicle would require the removal and interchange of several EAB Controllers at the same time. The primary RCL and two of the EAB Controllers, namely the Operator's Command Controller 14 and the Vehicle Input/Output Interface Controller 22, are not typical interchanged in routine maintenance practice. Any combination two of three of this configuration will authorize interchanged EAB Controllers.

An embellishment of the license disallows the inevitable cumulative collection of authorized Controllers that makes up a newly licensed EAB subsystem. Referring to FIG. 7, those intelligent controllers identified with a 1 are those that have been authorized by the license scheme described. For illustration, EAB G controller has recently been interchanged with that of a non authorized controller, designated with a (0). As described above, in an on power cycle, EAB G will become enabled to 1 as has EAB D that had previously been exchanged. There is now available an EAB G-1 and an EAB D-1 that are authorized. Eventually, through exchange of controllers, there shall be an entire EAB subsystem that shall be authorized. Eventually all controllers would become authorized removing the optional criteria.

Means of prevention is to randomly reassign a subsystem number anytime a controller is authorized. Controllers of a different number, outside the license scheme defined above, are non-authorized. Those of different numbers, but are within the confines of the license scheme, propagate a subsystem number reassignment. Referring to FIG. 8. EAB G controller has recently been interchanged with that of a non-authorized controller, designated with a (0). In the power cycle, EAB G will become authorized, however each designator within this subsystem shall be set to a random number, different to either that already assigned (8). The designator (8) had been assigned on the interchange of EAB D-3 earlier. There is now an EAB G-8 and an EAB D-3 that are authorized. As these controllers carry differing designators, and to the rules of the license scheme requiring the correct or allowable combination of like designators to authorize, the natural progression through exchange of controllers to a complete enabled subsystem is very unlikely.

Although the present invention has been described and illustrated in detail, it is to be clearly understood that this is done by way of illustration and example only and is not to be taken by way of limitation. The scope of the present invention are to be limited only by the terms of the appended claims.

What is claimed:

1. A locomotive brake system comprising:
a plurality of electronic air brake (EAB) controllers included on a locomotive connected to and controlling at least a train brake pipe and a locomotive brake pipe and being interconnected by an EAB communications network;
a locomotive interface device included on the locomotive and connected to the EAB communication network and configured to interface with both EAB network signals and signals issued from a remote locomotive controller (RLC) configured to communicate with the locomotive interface device, wherein the RLC includes a remote control transmitter (RCT) provided remote from the locomotive and configured to enable remote operation of the locomotive by an operator not on the locomotive; and
a system controller included on the locomotive and connected to the EAB communications network, the system controller configured to control both the configuration of the locomotive EAB controllers for an EAB mode and a remote mode of the locomotive brake system, wherein the remote mode of the locomotive enables the remote operation of the locomotive by an operator not on the locomotive, and wherein the system controller is further configured to assemble EAB network signals for communication between the RLC configured to communicate with the locomotive interface device and the plurality of locomotive EAB controllers, whereby the plurality of locomotive EAB controllers control the at least one train brake pipe in response to signals from the RLC,
wherein the locomotive interface device includes a plurality of constituent interface devices configured to connect to and communicate with each other via the EAB communication network using RLC signals and configured to each have an RLC port for connection to the RLC, wherein one of the constituent interface devices is a primary device which interfaces the EAB network signals and the RLC signals of the plurality of constituent interface devices.

2. The system of claim 1, wherein the locomotive interface device includes a plurality of RLC ports configured to connect to the RLC and interface the EAB network signals and the signals at the RLC ports.

3. The system of claim 1, wherein the RLC is configured to connect to at least one communication port or interface nodes configured to interface EAB network signals and signals of the RLC, wherein the interface nodes communicate with each other on the EAB communication network via RCL signals and each interface node has an RLC port for connection to the RLC.

4. The system of claim 1, whereas the locomotive interface device is configured to interface the EAB network signals and digital signals of the RLC communicating with the locomotive interface device.

5. The system of claim 1, whereas the locomotive interface device is configured to interface the EAB network signals and analog signals of the RLC communicating with the locomotive interface device.

6. The system of claim 1, whereas the locomotive interface device is configured to interface the EAB network signals and communication protocol signals of the RLC communicating with the locomotive interface device.

7. The system of claim 1, wherein the locomotive system controller is configured to assemble train and locomotive brake signals received from the locomotive interface device and transmit to the assembled signals to the locomotive EAB controllers on the EAB communication network, and the locomotive system controller is further configured to assemble and transmit status signals to the locomotive interface device.

8. The system of claim 1, wherein the locomotive interface device is configured to determine the type of RLC communicating with the locomotive interface device and configured to assemble EAB network signals for communication between the RLC and the locomotive EAB controllers on the network for the determined type of remote locomotive controller.

9. The system of claim 1, including the RLC, wherein the RLC is configured to communicate with the locomotive interface device, wherein the RLC is configured to receive commands from a remote device and generate EAB network signals to control at least the train brake pipe and the locomotive brake pipe.

10. The system of claim 1, including the RLC, wherein the RLC is configured to communicate with the locomotive interface device, wherein the RLC is configured to generate commands from on-board devices, including EAB network signals, to control at least the train brake pipe and the locomotive brake pipe.

11. The system of claim 1, including an electronic brake valve connected to EAB communication network and configured to provide EAB network signals.

12. The system of claim 1, wherein the EAB communication network is a local operating network (LON) network and the locomotive EAB controllers, the locomotive interface device and the locomotive system controller are nodes in the LON.

13. The system of claim 1, wherein the system includes locomotive EAB controllers that are specific to controlling one or more of a brake cylinder, an electrical train brake line and distributed power.

* * * * *